United States Patent
Kondo

(10) Patent No.: US 9,781,641 B2
(45) Date of Patent: Oct. 3, 2017

(54) WIRELESS COMMUNICATION SYSTEM, BASE STATION, AND CONTROL METHOD THEREFOR

(71) Applicant: NEC CORPORATION, Tokyo (JP)

(72) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/890,459

(22) PCT Filed: Dec. 13, 2013

(86) PCT No.: PCT/JP2013/083477
§ 371 (c)(1),
(2) Date: Nov. 11, 2015

(87) PCT Pub. No.: WO2014/192192
PCT Pub. Date: Dec. 4, 2014

(65) Prior Publication Data
US 2016/0112906 A1 Apr. 21, 2016

(30) Foreign Application Priority Data
May 29, 2013 (JP) ................................. 2013-112632

(51) Int. Cl.
*H04W 36/00* (2009.01)
*H04W 24/02* (2009.01)
(Continued)

(52) U.S. Cl.
CPC ....... *H04W 36/0061* (2013.01); *H04W 24/02* (2013.01); *H04W 36/0083* (2013.01); *H04W 88/08* (2013.01); *H04W 92/20* (2013.01)

(58) Field of Classification Search
CPC ................................ H04W 4/00; H04W 40/00
(Continued)

(56) References Cited

U.S. PATENT DOCUMENTS

| 8,265,028 B2 * | 9/2012 | Davies | H04W 8/26 370/329 |
| 2010/0020710 A1 * | 1/2010 | Gupta | H04J 11/0093 370/252 |
| 2010/0291934 A1 | 11/2010 | Lopes | |

FOREIGN PATENT DOCUMENTS

| JP | 2011-504351 A | 2/2011 |
| JP | 2011-527880 A | 11/2011 |
| JP | 2013-021450 A | 1/2013 |

OTHER PUBLICATIONS

International Search Report for PCT/JP2013/083477 dated Feb. 10, 2014.
(Continued)

*Primary Examiner* — Charles Appiah
*Assistant Examiner* — Margaret G Mastrodonato
(74) *Attorney, Agent, or Firm* — Sughrue Mion, PLLC

(57) ABSTRACT

The base station of the present invention manages a cell and is capable of communicating with peripheral base stations that manage cells that are adjacent to this cell. When assigning to the cell that it manages a cell identifier that identifies the cell, the base station supplies a determination request whether or not to assign the cell identifier that is intended to be assigned to the peripheral base stations, and when, in response to the determination request, an indication of permission to assign the cell identifier that is intended to be assigned is supplied from the peripheral base stations, the base station assigns the cell identifier that is intended to be assigned to the cell that the base station manages. When a determination request whether or not to assign a cell identifier that is intended to be assigned is supplied from a peripheral base station, the base station determines whether or not to assign the cell identifier that is intended to be assigned according to the state of assignment of cell identifiers to cells that are adjacent to the cell that it manages, (Continued)

and supplies the determination result to the peripheral base station that originated of the determination request.

6 Claims, 6 Drawing Sheets

(51) Int. Cl.
      *H04W 88/08*     (2009.01)
      *H04W 92/20*     (2009.01)

(58) Field of Classification Search
      USPC .......................................................... 455/446
      See application file for complete search history.

(56) References Cited

OTHER PUBLICATIONS

Communication dated Dec. 22, 2016 from the European Patent Office in counterpart application No. 13886135.6.

Liu et al., "Distributed PCI assignment in LTE based on consultation mechanism," Wireless Communications Networking and Mobile Computing (WICOM), Sep. 23, 2010, $6^{th}$ International Conference on IEEE (4 pages total).

Alcatel-Lucent et al., "Further Enhancements of Neighbor Information Exchange over X2," 3GPP TSG-RAN WG3 #61bis; R3-082612, Sep. 30-Oct. 3, 2008; Prague, Czech Republic (6 pages total).

Qualcomm Europe et al., "Framework for distributed PCI selection," 3GPP TSG-RAN WG3 #61; R3- 082228, Aug. 18-22, 2008; Jeju Island, Korea (5 pages total).

Qualcomm Incorporated, NTT DOCOMO, INC., Automatic PCI Selection at Relay Nodes, 3GPP TSG-RAN WG3#70 R3-103406, 3GPP, Nov. 15, 2010, 2 pages.

Communication dated Dec. 13, 2016, from the Japanese Patent Office in counterpart Japanese application No. 2015-519607.

\* cited by examiner

WIRELESS COMMUNICATION SYSTEM, BASE STATION, AND CONTROL METHOD THEREFOR

CROSS REFERENCE TO RELATED APPLICATIONS

This application is a National Stage of International Application No. PCT/JP2013/083477 filed Dec. 13, 2013, claiming priority based on Japanese Patent Application No. 2013-112632 filed May 29, 2013, the contents of all of which are incorporated herein by reference in their entirety.

TECHNICAL FIELD

The present invention relates to a wireless communication system, a base station, and a control method of the base station.

BACKGROUND ART

In order to identify each of the cells that are managed by a base station in a cellular wireless communication system such as an LTE (Long Term Evolution) system, a Physical Cell Identity (PCI) is assigned to each cell (for example, refer to Patent Document 1 (Japanese Unexamined Patent Application Publication No. 2013-021450)). A PCI is used for identifying cells at the time of, for example, performing handover that switches the cells to which a mobile station is connected. As a result, a PCI must be assigned to each cell to prevent the occurrence of PCI Collision in which the same PCI is assigned to a plurality of cells that are arranged in proximity.

In the following explanation, the operation of a base station according to a typical method of assigning PCI is described with reference to the sequence chart shown in FIG. 2 taking as an example a case in which cell #19 is newly arranged in a state in which a plurality of cells, to which PCI have been assigned (cells #1-#18), are arranged as shown in FIG. 1. In the following explanation, the base station that manages cell #19 is referred to as the newly-established base station, and the base stations that manage adjacent cells (cells #1-#6) that are adjacent to cell #19 are referred to as peripheral base stations.

The peripheral base stations acquire cell information that indicates the PCI assigned to the adjacent cells from base stations that manage the adjacent cells of the cells they manage (Step S11). For example, the base station that manages cell #6 acquires cell information from the base stations that manage cells #1, #5, #7, #17, and #18.

The peripheral base stations next, upon receiving an inquiry from the newly-established base station, regarding the adjacent cells of cell #19 create adjacent cell lists that indicate the PCI assigned to the adjacent cells based on the acquired cell information and supply the adjacent cell lists to the newly-established base station (Step S12).

The newly-established base station determines a candidate of the PCI that is intended to be assigned to cell #19 based on the adjacent cell lists (Step S13). Here, the newly-established base station determines a PCI other than the PCI indicated in the adjacent cell lists as the assignment candidate PCI. PCI (PCI #0-#17) that have been assigned cells that are adjacent to cell #19 (cells #1-#6) and the cells that are adjacent to these adjacent cells (cells #7-#18) are included in the adjacent cell lists that were acquired from the peripheral base stations. Accordingly, the newly-established base station determines, for example, PCI #18, that has not been assigned to cells #1-#18, as the assignment candidate PCI.

The newly-established base station then assigns PCI #18, that was determined as the assignment candidate, to cell #19 (Step S14) and supplies to the peripheral base stations a PCI assignment notification that indicates that PCI #18 has been assigned to cell #19 (Step S15).

By thus assigning a PCI, that is not contained in the adjacent cell lists acquired from the peripheral base stations, to the cell that is the object of assignment, the newly-established base station is able to prevent the occurrence of a PCI collision between cells that are adjacent to cell that is the object of assignment and the cells that are adjacent to these adjacent cells.

Although this explanation used an example in which cell #19 is newly arranged in FIG. 1 and FIG. 2, the base station that changes the PCI of cell #19 (hereinbelow referred to as the "altering base station") is also able to change the PCI by the using same process as that of the newly-established base station shown in FIG. 2 in a case in which cell #19 has already been arranged and the PCI of cell #19 is to be changed.

LITERATURE OF THE PRIOR ART

Patent Documents

Patent Document 1: Japanese Unexamined Patent Application Publication No. 2013-21450

SUMMARY OF THE INVENTION

Problem to be Solved by the Invention

In the typical PCI assignment method described hereinabove, when base stations assign PCI to the cells they manage, each base station determines the PCI that is assigned to the cell it manages based on adjacent cell lists that are acquired from peripheral base stations. In addition, this process may consume a time interval of several hours from the time the base stations begin assignment to cells that they manage until the PCI are actually assigned. The problem therefore arises that a PCI collision will occur in which the same PCI (PCI #17) is assigned to cell #18 and cell #20 that are adjacent, as shown in FIG. 3.

When a PCI collision occurs, the PCI that is assigned to the cell where the PCI collision occurred is altered. For example, in FIG. 3, the PCI assigned to cell #18 is altered. In the following explanation, the PCI assigned to cell #18 is assumed to be altered from PCI #17 to PCI #18.

In the typical PCI assignment method described above, there is a further problem that, with the alteration of the PCI assigned to cell #18, a PCI collision will again occur. This problem is described hereinbelow with reference to FIG. 3.

In FIG. 3, due to a PCI collision between cell #18 and cell #20, it is assumed that the base station that manages cell #18 will attempt to alter the PCI assigned to cell #18 from PCI #17 to PCI #18.

Here, PCI #17 is assigned to cell #18 at the time at which the base station that manages cell #6 acquires cell information of cell #18, and the PCI that is assigned to cell #18 is PCI #17 in the adjacent cell list that is produced by the base station that manages cell #6. As a result, when the newly-established/altering base station (the base station that manages cell #19) assigns PCI #18 to cell #19 based on this adjacent cell list, a PCI collision occurs between cell #18 and cell #19 due to the alteration of the PCI assigned to cell #18 by the base station that manages cell #18.

Thus, in the typical PCI assignment method described above, the newly-established/altering base station assigns PCI to the cell that is the object of assignment without checking with the peripheral base stations regarding whether or not to assign the PCI that was determined as an assignment candidate, and as a result, the potential exists for the occurrence of a PCI collision.

It is an object of the present invention to provide a wireless communication system, a base station, and a control method that can reduce the possibility of a PCI collision.

Means for Solving the Problem

The wireless communication system of the present invention for achieving the above-described object is a wireless communication system in which each of a plurality of base stations that manage cells is capable of communication with base stations that manage cells that are adjacent to the cell that the base station manages, wherein each of the plurality of base stations has a control unit that:

when assigning a cell identifier that identifies the cell to the cell that the base station manages, supplies to peripheral base stations that are base stations that manage cells that are adjacent to the cell a determination request regarding whether or not to assign the cell identifier that is intended to be assigned, and when, in response to the determination request, permission to assign the cell identifier that is intended to be assigned is supplied from the peripheral base stations, assigns the cell identifier that is intended to be assigned to the cell that the base station manages; and when a determination request regarding whether or not to assign a cell identifier that is intended to be assigned is supplied from a peripheral base station, determines whether or not to assign the cell identifier that is intended to be assigned according to the state of assignment of cell identifiers to cells that are adjacent to the cell that the base station manages, and supplies the result of determination to the peripheral base station that is the request origin of the determination request.

The base station of the present invention for achieving the above-described object is a base station that manages a cell and that is able to communicate with peripheral base stations that are base stations that manage cells that are adjacent to the cell, the base station including a control unit that:

when assigning to the cell that the base station manages a cell identifier that identifies the cell, supplies to the peripheral base stations a determination request regarding whether or not to assign the cell identifier that is intended to be assigned, and when, in response to the determination request, permission to assign the cell identifier that is intended to be assigned is supplied from the peripheral base stations, assigns the cell identifier that is intended to be assigned to the cell that the base station manages; and when a determination request regarding whether or not to assign a cell identifier that is intended to be assigned is supplied from a peripheral base station, determines, according to the state of assignment of cell identifiers to cells that are adjacent to the cell that the base station manages, whether the cell identifier that is intended to be assigned can be assigned, and supplies the determination result to the peripheral base station that is the request origin of the determination request.

The control method of the present invention for achieving the above-described object is a control method of a base station that manages a cell and that is capable of communication with peripheral base stations that are base stations that manage cells that are adjacent to the cell, wherein:

when a cell identifier, that identifies the cell, is to be assigned to the cell that the base station manages, a determination request regarding whether or not to assign the cell identifier that is intended to be assigned is supplied to the peripheral base stations, and when, in response to the determination request, permission to assign the cell identifier that is intended to be assigned is supplied from the peripheral base stations, the cell identifier that is intended to be assigned is assigned to the cell that the base station manages; and when a determination request regarding whether or not to assign a cell identifier that is intended to be assigned is supplied from a peripheral base station, the determination whether or not to assign the cell identifier that is intended to be assigned is made according to the state of assignment of cell identifiers to cells that are adjacent to the cell that the base station manages, and the result of determination is supplied to the peripheral base station that is the request origin of the determination request.

According to the present invention, the potential for of a PCI collision to occur can be reduced.

MODE FOR CARRYING OUT THE INVENTION

An exemplary embodiment of the present invention is next described with reference to the accompanying drawings.

Figure 4:
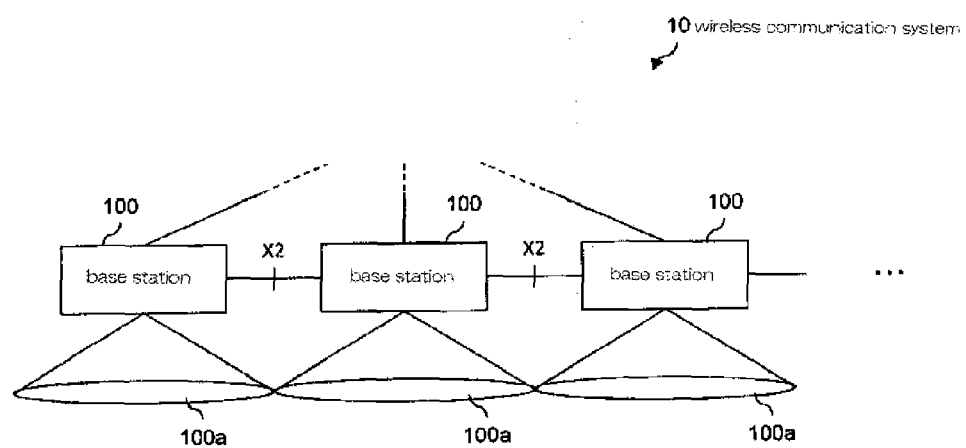
FIG. 4 shows the principal configuration of a wireless communication system of an exemplary embodiment of the present invention.

FIG. 4 shows the principal configuration of wireless communication system 10 of an exemplary embodiment of the present invention.

Communication system 10 shown in FIG. 4 is provided with a plurality of base stations (eNodeB) 100.

Base stations 100 manage cells 100A that are predetermined communication areas and carry out wireless communication with mobile stations (not shown in the figure) that are in the range of cells 100A. FIG. 4 shows an example in which base stations 100 each manage one cell 100A, but base stations 100 may each manage a plurality of cells 100A.

Base stations 100 are able to communicate with other base stations 100 by way of an X2 interface. In addition, base stations 100 are connected to a host device (not shown) on the network side.

Figure 5:
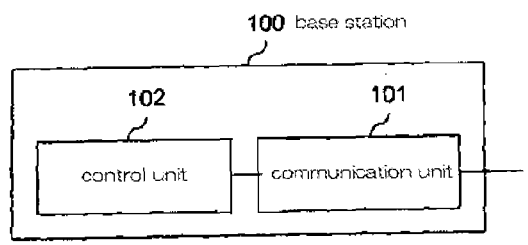
FIG. 5 is a block diagram showing the principal configuration of the base station shown in FIG. 4.

FIG. 5 is a block diagram showing the principal configuration of base station 100. FIG. 5 omits any description of the configuration by which base station 100 carries out wireless communication with mobile station 100 or the configuration by which base station 100 carries out communication with the host device.

Base station 100 shown in FIG. 5 includes communication unit 101 and control unit 102.

Communication unit 101 carries out communication with other base stations 100 by way of an X2 interface.

Control unit 102 assigns PCI to cells that base station 100 manages. In addition, control unit 102 both supplies cell information, that indicates PCI that is assigned to the cell that base station 100 manages by way of communication unit 101, to peripheral base stations that manage cells that are adjacent to this cell and receives the input of cell information from peripheral base stations.

When newly assigning a PCI to the cell that it manages, control unit 102 further communicates to peripheral base stations a determination request that requests determination regarding whether or not to assign the PCI, and when, in response to the determination request, a determination request response is communicated from the peripheral base stations that indicates that assignment of the PCI is permitted, assigns the PCI to the cell that it manages.

Upon communication from another base station 100 indicating for a request to determine whether or not to assign a PCI to a cell that that base station 100 manages, control unit 102 further determines whether to permit assignment of the PCI and communicates the result of determination to base station 100 that is the origin of the determination request.

The operation of base station 100 is next described.

Figure 1:
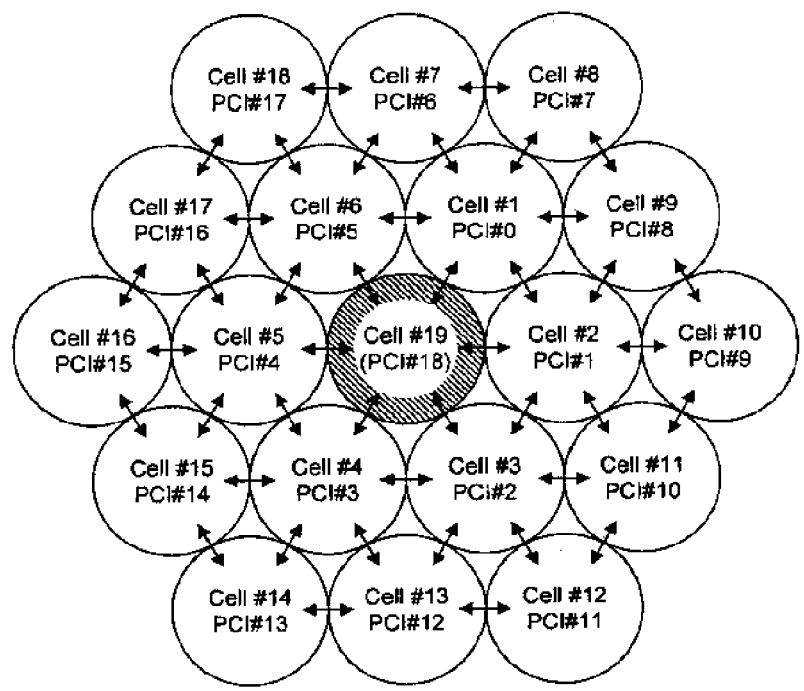
FIG. 1 shows an example of the assignment of PCI by a related PCI assignment method.
Figure 2:
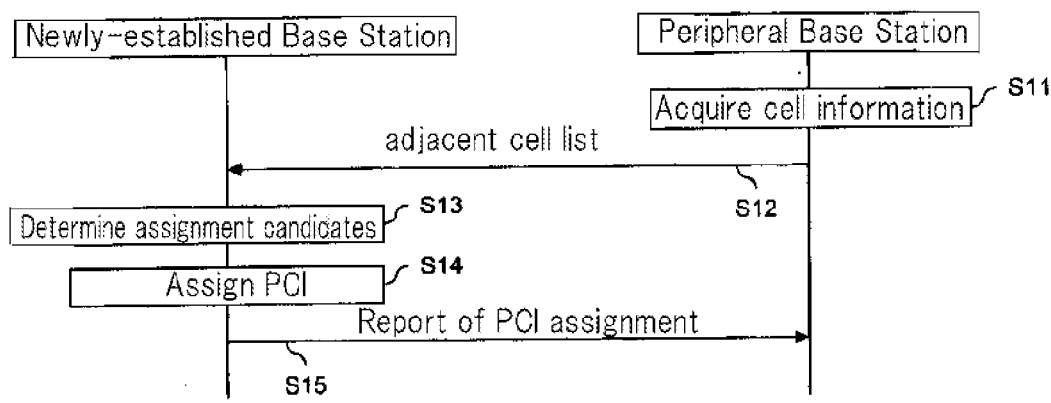
FIG. 2 is a sequence chart showing an example of the operation of a base station when assigning PCI by a related PCI assignment method.
Figure 3:
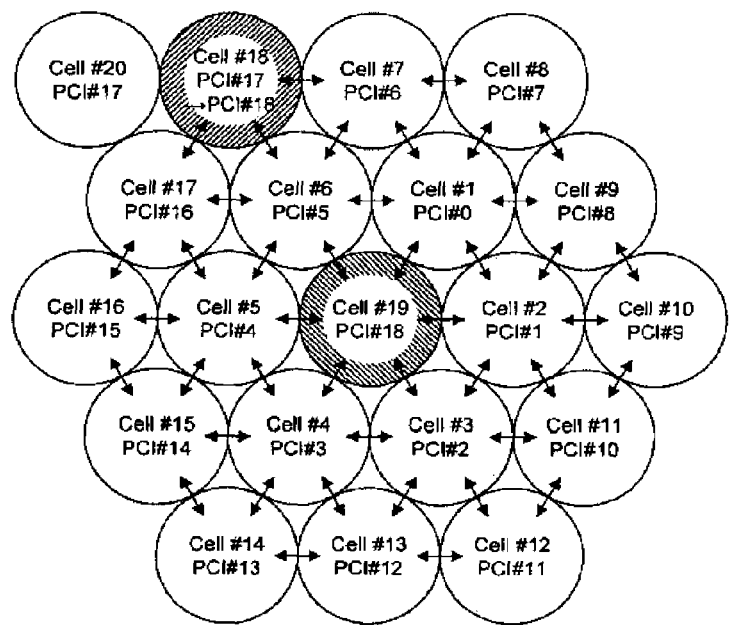
FIG. 3 shows an example of the assignment of PCI by a related PCI assignment method.

As shown in FIG. 1, the following explanation takes as an example a case in which cell #19 is newly arranged in a state in which a plurality of cells (cell #1-#18) to which PCI have been assigned are arranged or a case in which the PCI of cell #19 is to be altered in a state in which cells #1-#19 have already been arranged. In this case, base station 100 that manages cell #19 is the newly-established/altering base station, and base stations 100 that manage cells #1-#6 that are adjacent to cell #19 are the peripheral base stations.

Figure 6:
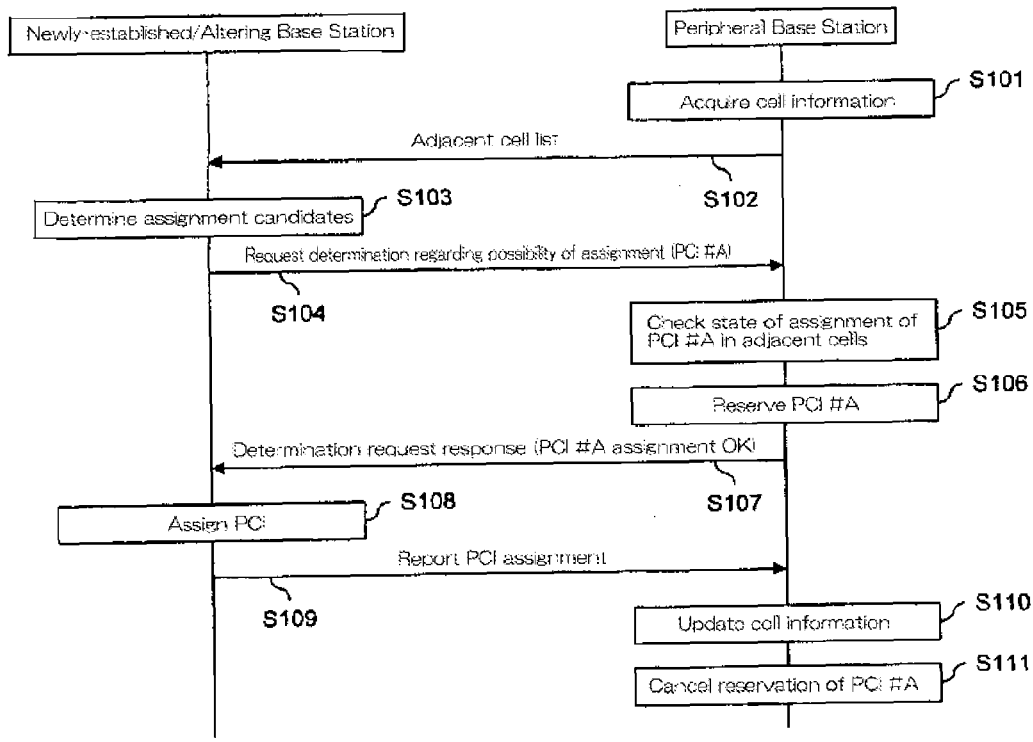
FIG. 6 is a sequence chart that shows an example of the operation of the base station shown in FIG. 4 at the time of assigning PCI.

FIG. 6 is a sequence chart showing the operations of base stations 100.

Control unit 102 of a peripheral base station acquires cell information that indicates the PCI that have been assigned to adjacent cells from the base stations that manage the cells that are adjacent to the cell that it manages (Step S101). The acquisition of the cell information is carried out by the transmission and reception of eNB Configuration Update messages by way of the already existing X2 interface.

Control unit 102 of a peripheral base station, upon receiving an inquiry regarding the adjacent cells that are adjacent to cell #19 from the newly-established/altering base station, creates an adjacent cell list that indicates the PCI that have been assigned to cells that are adjacent to the cell it manages based on cell information that has been acquired and supplies the adjacent cell list to the newly-established/altering base station (Step S102).

Based on the adjacent cell list, control unit 102 of the newly-established/altering base station determines a candidate PCI that is intended to be assigned to the cell that is the object of PCI assignment (Step S103). Control unit 102 determines, as the assignment candidate PCI, a PCI other than the PCI that are indicated in the adjacent cell list. In the following explanation, control unit 102 is assumed to determine PCI #A as the assignment candidate.

Control unit 102 of new-established/altering base station next supplies a request to the peripheral base station, by way of communication unit 101 (Step S104), to determine whether or not to assign the PCI that was determined as the assignment candidate (PCI #A).

When the request to determine whether or not to assign PCI #A is supplied, control unit 102 of each peripheral base station checks the state of assignment of PCI #A in cells that are adjacent to the cell that it manages (Step S105) and decided whether or not to assign PCI #A. More specifically, control unit 102 permits the assignment of PCI #A when PCI #A has not been assigned to adjacent cells, and further, when the assignment of PCI #A has not been reserved. In other words, control unit 102 permits the assignment of PCI #A when PCI #A, concerning which a request was made whether or not to assign it, does not match PCI are indicated in the cell information of cells that are adjacent to the cell that it manages and permits assignment of the PCI, concerning which a request was made whether or not to assign it from base stations other than the base station that originated the determination request. Control unit 102 is able to check whether or not the assignment of PCI #A is reserved according to whether a determination request to determine whether or not to assign PCI #A is output from base stations 100 other than base station 100 that supplied the request to determine whether or not to assign PCI #A.

In the following explanation, it will be assumed that PCI #A is not assigned to a cell that is adjacent to the cells that the peripheral base stations manage and that the assignment of PCI #A has not been reserved.

Control unit 102 of each peripheral base station, having permitted the assignment of PCI #A, reserves the assignment of PCI #A (Step S106) and supplies a determination request response (to the newly-established/altering base station (Step S107)) indicating that the assignment of PCI #A is permitted (assignment OK).

Upon being supplied with the determination request responses indicating that the assignment of PCI #A is permitted from all peripheral base stations, control unit 102 of the newly-established/altering base station assigns PCI #A to the cell that is the object of assignment (Step S108) and supplies notification of the PCI assignment, that indicates that PCI #A was assigned to the assignment object cell (cell #19), to the peripheral base stations (Step S109). The notification of PCI assignment is realized by the transmission and reception of eNB Configuration Update messages by way of the existing X2 interface.

Upon being supplied with the notification of PCI assignment indicating that PCI #A was assigned to cell #19, control unit 102 of each peripheral base station updates the cell information of cell #19 (Step S110), cancels the reservation of PCI #A (Step S111), and ends the process.

Figure 7:
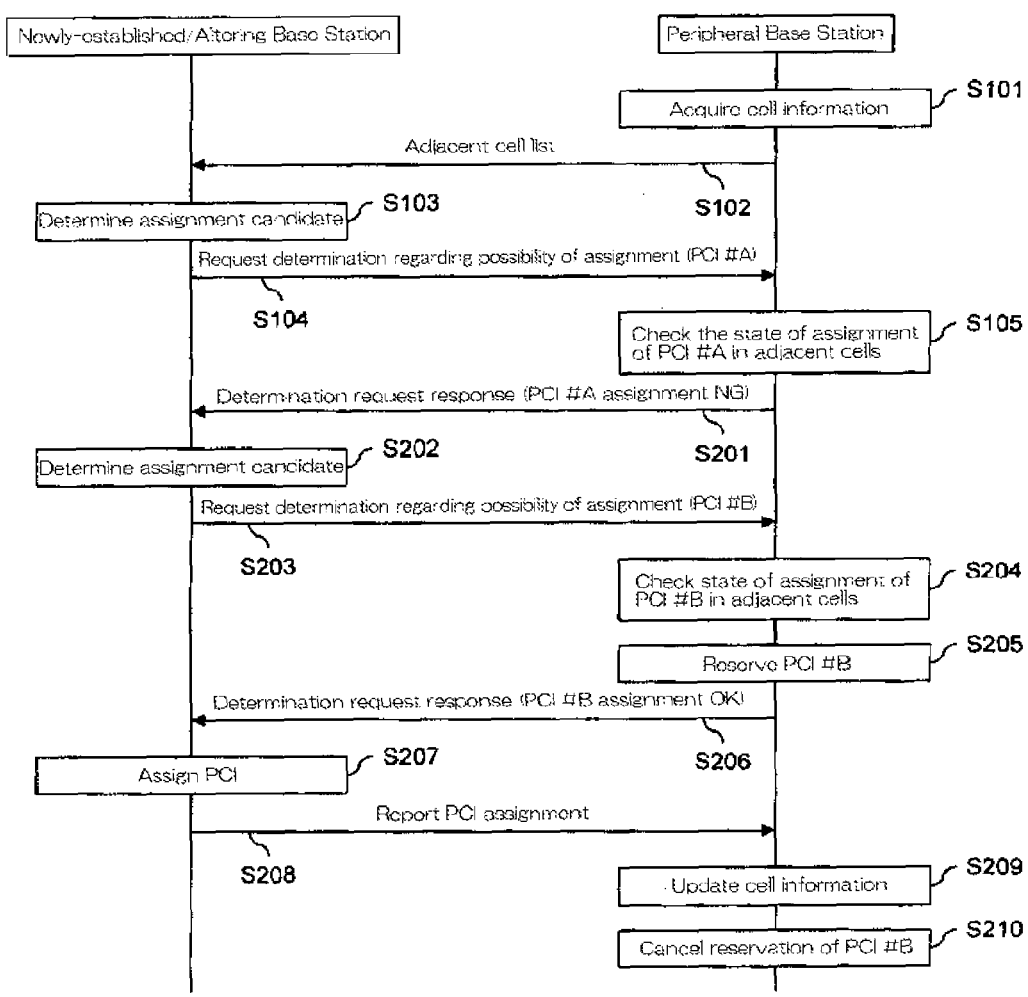
FIG. 7 is a sequence chart showing an example of the operation of the base station shown in FIG. 4 at the time of assigning PCI.

The operation that is performed when the assignment of an assignment candidate PCI is not permitted by a peripheral base station is next described with reference to FIG. 7. In FIG. 7, processes identical to those of FIG. 6 are given the same reference numbers and redundant explanation is omitted.

When PCI #A has been assigned to a cell that is adjacent to the cell it manages or when the assignment of PCI #A has been reserved, control unit 102 of the peripheral base station determines not to permit the assignment of PCI #A and supplies a determination request response indicating that the assignment of PCI #A is not permitted (assignment NG) (Step S201).

Newly-established/altering base station 102, having been supplied with the determination request response from the peripheral base station indicating that the assignment of PCI #A is not permitted, again determines an assignment candidate PCI based on the adjacent cell lists (Step S202). Here, control unit 102 determines a candidate of the assignment candidate PCI while excluding PCI #A. In the following explanation, it is assumed that control unit 102 determines PCI#B as the assignment candidate.

Control unit 102 of the newly-established/altering base station next supplies to the peripheral base stations a determination request a determination request whether or not to assign PCI #B (Step S203).

Control unit 102 of each peripheral base station, having been supplied with the determination request a determination request whether or not to assign PCI #B, checks the state of assignment of PCI #B cells that are adjacent to the cell it manages (Step S204) and determines whether PCI #B can be assigned. In the following explanation, it is assumed that PCI #B is not assigned to cells that are adjacent to the cells managed by the peripheral base stations and that the assignment of PCI #B is not reserved.

When PCI #B is not assigned to cells that are adjacent to the cells managed by the peripheral base stations and the assignment of PCI #B is not reserved, control unit 102 of each peripheral base station determines to permit assigning of PCI #B and then both reserves the assignment of PCI #B (Step S205) and supplies a determination request response indicating that the assignment of PCI #B is permitted (Step S206).

Control unit 102 of the newly-established/altering base station, having been supplied with determination request responses from all peripheral base stations indicating that the assignment of PCI #B is permitted, assigns PCI #B to the assignment object cell (Step S207), and supplies PCI assignment notification to the peripheral base stations indicating that PCI #B was assigned to the assignment object cell (cell #19) (Step S208).

Control unit 102 of the peripheral base station, having been supplied with the PCI assignment notification indicating that PCI #B was assigned to cell #19, updates the cell information of cell #19 (Step S209), cancels the reservation of PCI #B (Step S210), and ends processing.

Figure 8:
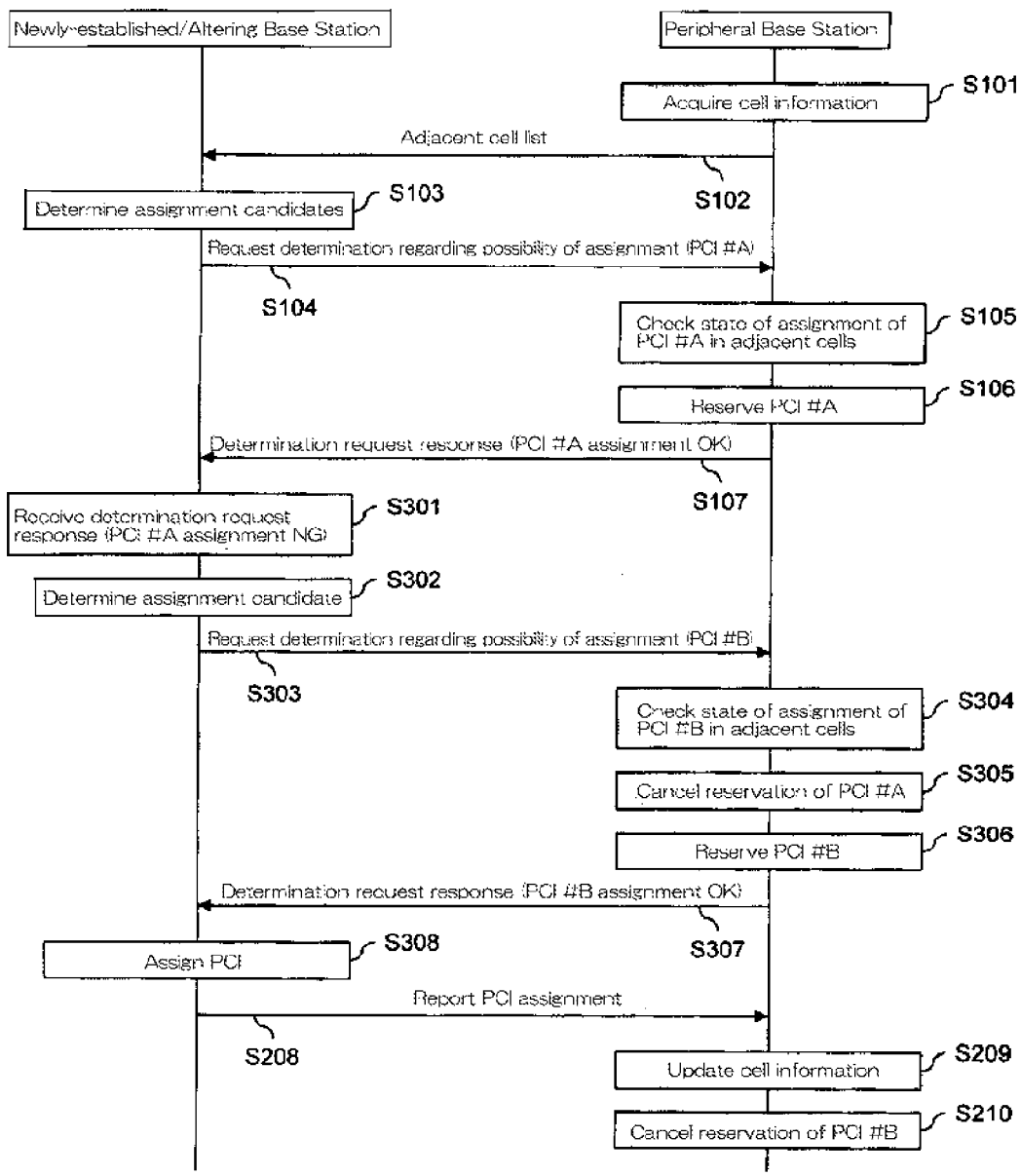
FIG. 8 is a sequence chart showing an example of the operation of the base station shown in FIG. 4 at the time of assigning PCI.

The operation that is performed when the assignment of the assignment candidate PCI is permitted by a particular peripheral base station but not permitted by another peripheral base station is described with reference to FIG. 8. In FIG. 8, processes that are identical to those of FIGS. 6 and 7 are given the same reference numbers and redundant explanation is here omitted.

Even when a determination request response indicating that the assignment of PCI #A is permitted is supplied from a particular peripheral base station, when a determination request response, indicating that the assignment of PCI #A is permitted, is supplied from another peripheral base station (Step S301), control unit 102 of the newly-established/altering base station again determines an assignment candidate PCI based on the adjacent cell lists (Step S302). Here, control unit 102 determines assignment candidate PCI while excluding PCI #A. In the following explanation, it is assumed that control unit 102 determines PCI#B as the assignment candidate.

Control unit 102 of the newly-established/altering base station next supplies to the peripheral base stations a determination request whether or not to assign PCI #B (Step S303).

Upon supply of the determination request regarding whether or not to assign PCI #B, control unit 102 of each peripheral base station checks the assignment state of PCI #B in adjacent cells of the cells it manages (Step S304) and judges whether or not to assign PCI #B. In the following explanation, it is assumed that PCI #B is not assigned to cells that are adjacent to the cells managed by the peripheral base stations, and further, that the assignment of PCI #B is not reserved.

If PCI #B is not assigned to cells that are adjacent to the cells managed by a peripheral base station and the assignment of PCI #B is not reserved, control unit 102 of the peripheral base station determines to permit the assigning of PCI #B and both cancels the reservation of PCI #A (Step S305) and reserves the assignment of PCI #B (Step S306).

Control unit 102 of the peripheral base station next supplies a determination request response indicating permission to assign PCI #B (Step S307).

When determination request responses indicating that the assignment of PCI #B is permitted have been supplied from all peripheral base stations, control unit 102 of the newly-established/altering base station assigns PCI #B to the assignment object cell (Step S308) and proceeds to the process of Step S208.

An example of the assignment of PCI to cells in wireless communication system 10 is next described.

Figure 9:
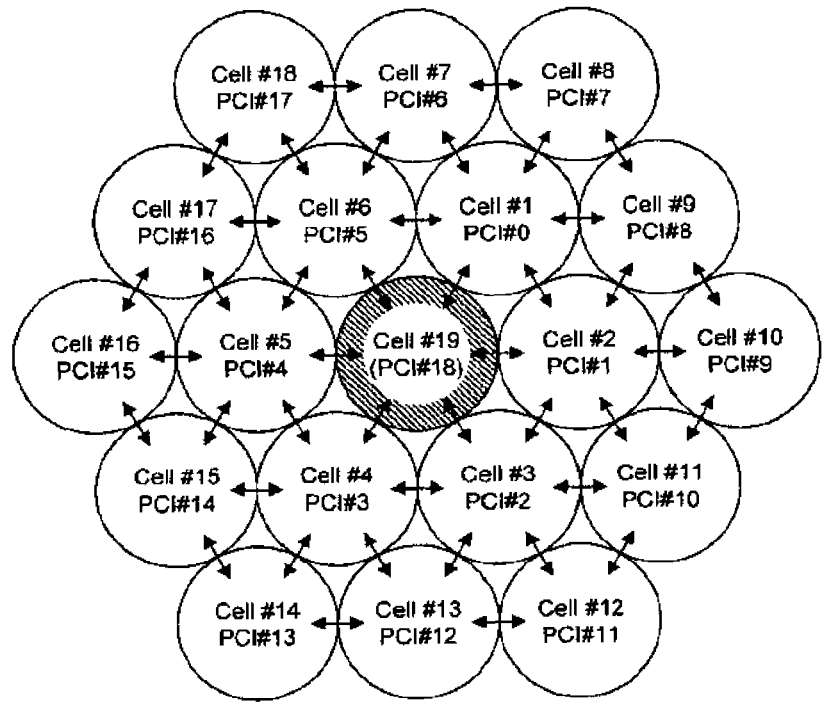
FIG. 9 shows an example of the assignment of PCI in the wireless communication system shown in FIG. 4.

FIG. 9 shows an example of the assignment of PCI to a plurality of cells in wireless communication system 10 of the present exemplary embodiment. In FIG. 9, an example is described in which cell #19 is to be newly disposed in a state in which PCI are assigned to each of cells #1-#18, or in which cell #19 has already been disposed but in which the PCI assigned to cell #19 is to be altered. Accordingly, cell #19 is the assignment object cell, base station 100 that manages cell #19 is the newly-established/altering base station, and base stations 100 that manage cells #1-#6 that are adjacent to cell #19 are peripheral base stations.

It is further assumed in FIG. 9 that the assignment of PCI #18 is not reserved in any base station.

Each of base stations 100 that manage cells #1-#6 acquires cell information of the cells that are adjacent to the cell it manages.

Upon receiving an inquiry regarding cells that are adjacent to cell #19 from base station 100 that manages cell #19, each of base stations 100 that manage cells #1-#6 creates an adjacent cell list based on the cell information that it has acquired and supplies the created adjacent cell list to base station 100 that manages cell #19. Accordingly, PCI (PCI #0-#17) that have been assigned to cells that are adjacent to cell #19 (cells #1-#6) and the cells that are adjacent to these adjacent cells (cells #7-#18) are included in some of the adjacent cell lists supplied from each of base stations 100 that manage cells #1-#6.

Base station 100 that manages cell #19 determines PCI #18 that is not included in the adjacent cell list as an assignment candidate and supplies to the peripheral base stations a determination request regarding whether or not to assign PCI #18.

PCI #18 is not assigned to cells that are adjacent to cells #1-#6. In addition, as described hereinabove, the assignment of PCI #18 is not reserved in any of the base stations. As a result, each of base stations 100 that manage cells #1-#6 supplies a determination request response indicating permission to assign PCI #18 to base station 100 that manages cell #19.

Upon supply of determination request responses from all of the peripheral base stations, indicating permission to assign PCI #18 base station 100 that manages cell #19 assigns cell #18.

Figure 10:
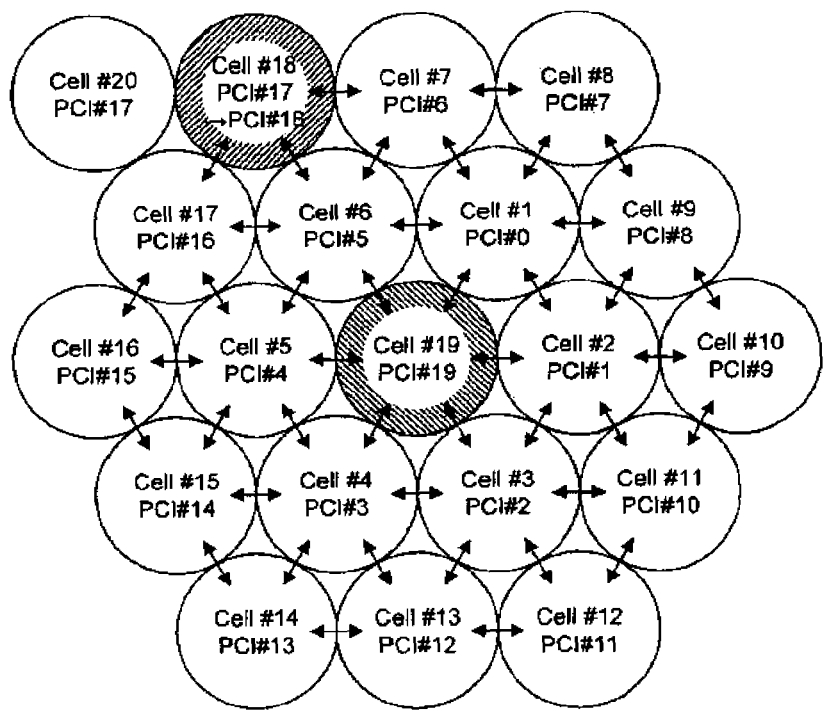
FIG. 10 shows an example of the assignment of PCI in the wireless communication system shown in FIG. 4.

FIG. 10 shows another example of the assignment of PCI to a plurality of cells in wireless communication system 10. Compared with FIG. 9, cell #20 that is adjacent to cell #18 is added in FIG. 10. It is here assumed that PCI #17 that is the same as for cell #18, has been assigned to cell #20.

In addition, because a PCI collision occurs between cell #18 and cell #20, base station 100 that manages cell #18 is assumed to supply, to base station 100 that manages cell #6 that is adjacent to cell #18, a determination request regarding whether or not to assign PCI #18 in order to alter the PCI, that is assigned to cell #18, from PCI #17 to PCI #18.

Because PCI #18 has not been assigned to adjacent cells of cell #6, when the determination request whether or not to assign PCI #18 is supplied from base station 100 that manages cell #18, base station 100 that manages cell #6 supplies, to base station 100 that manages cell #18, a determination request response that indicates permission to assign PCI #18. Base station 100 that manages cell #6 further reserves the assignment of PCI #18.

In this state, base station 100 that manages cell #19 determines PCI #18 that is not included in the adjacent cell lists that were reported from the peripheral base stations as an assignment candidate, and upon supplying a determination request whether or not to assign PCI #18, base station 100 that manages cell #6 supplies to base station 100 that manages cell #19 a determination request response indicating that the assigning of PCI #18 is not permitted because the assignment of PCI #18 has been reserved.

Because a determination request response indicating that the assignment of PCI #18 is not permitted has been supplied, base station 100 that manages cell #19 again determines an assignment candidate PCI. Base station 100 that manages cell #19 here determines, as an assignment candidate PCI, a PCI other than PCI included in the adjacent cell lists and PCI #18, for example, PCI #19.

Base station 100 that manages cell #19 next supplies to the peripheral base stations a determination request regarding whether or not to assign PCI #19.

PCI #19 is not assigned to cells that are adjacent to each of cells #1-#6. The assignment of PCI #19 is not reserved in any of the base stations. As a result, base stations 100 that manage cells #1-#6 each supply to base station 100 that manages cell #19 a determination request response that indicates permission to assign PCI #19.

If determination request responses indicating that the assignment of PCI #19 is permitted are supplied from all of the peripheral base stations, base station 100 that manages cell #19 assigns cell #18 to cell #19.

If base station 100 that manages cell #19 here assigns PCI #18 that was determined as an assignment candidate to cell #19 without checking with the peripheral base stations whether or not to assign PCI #18, a PCI collision will occur between cell #18 and cell #19. However, due to the output to the peripheral base stations of a determination request whether or not to assign the assignment candidate PCI by base station 100 that manages the assignment object cell and the determination that is made by the peripheral base stations whether or not to assign the assignment candidate PCI, based on the state of assignment of PCI in cells that are adjacent to the cells that they manage as in the present exemplary embodiment, the potential for the occurrence of PCI collisions can be reduced.

Thus, according to wireless communication system 10 of the present exemplary embodiment, when base station 100 assigns a cell identifier to the cell that it manages, it supplies to peripheral base stations a determination request regarding whether or not to assign the cell identifier that is intended to be assigned, and when, in response to the determination request, permission to assign the cell identifier that is intended to be assigned is supplied from the peripheral base stations, base station 100 assigns the cell identifier that is intended to be assigned to the cell that it manages. Further, when a determination request whether or not to assign a cell identifier that is intended to be assigned is supplied from a peripheral base station, base station 100 determines whether or not to assign the cell identifier that is intended to be assigned according to the state of assignment of cell identifiers to cells that are adjacent to the cell it manages and supplies the determination result to base station 100 originated of the request.

As a result, the potential for PCI collisions to occur can be reduced.

The invention of the present application has been described hereinabove with reference to an exemplary embodiment, but the present invention is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2013-112632 for which application was submitted on May 29, 2013 and incorporates by citation all of the disclosures of that application.

What is claimed is:

1. A wireless communication system in which each of a plurality of base stations that manage cells is capable of communication with base stations that manage cells that are adjacent to the cell that said base station manages, wherein each of said plurality of base stations has a control unit that:
when assigning to a cell that at least one of said base stations manages a cell identifier that identifies the cell, supplies to a plurality of peripheral base stations that are ones of said base stations that manage cells that are adjacent to said cell a determination request regarding whether or not to assign said cell identifier that is intended to be assigned, and when, in response to said determination request, permission to assign said cell identifier that is intended to be assigned is supplied from said plurality of peripheral base stations, assigns said cell identifier that is intended to be assigned to said cell that said at least one of said base stations manages; and
when a determination request whether or not to assign said cell identifier that is intended to be assigned is supplied from said plurality of peripheral base stations, determines whether or not to assign said cell identifier that is intended to be assigned according to a state of assignment of cell identifiers to ones of said cells that are adjacent to said cell that said at least one of said base stations manages, and supplies a result of determination to at least one of said plurality of peripheral base stations that originated said determination request;

wherein said control unit:
supplies to said plurality of peripheral base stations cell information that indicates said cell identifier that is assigned to said cell that said at least one of said base stations manages; and upon supplying a determination request whether or not to assign said cell identifier that is intended to be assigned, permits assignment when said cell identifier that is intended to be assigned does not match a first cell identifier that is indicated in cell information that was supplied from the at least one of said plurality of peripheral base stations or does not match a second cell identifier for which determination whether or not to assign a PCI was requested from at least one other of said plurality of peripheral base stations other than said at least one of the plurality of base stations that originated the request.

2. The wireless communication system as set forth in claim 1, wherein said control unit determines said cell identifier that is intended to be assigned to said cell that said base station manages based on cell identifier information that is supplied from said plurality of peripheral base stations.

3. A base station that manages a cell and that is capable of communication with a plurality of peripheral base stations that are base stations that manage cells that are adjacent to said cell, wherein said base station has a control unit that:

when assigning to said cell that said base station manages a cell identifier that identifies the cell, supplies to said plurality of peripheral base stations a determination request whether or not to assign said cell identifier that is intended to be assigned, and when, in response to said determination request, an indication of permission to assign said cell identifier that is intended to be assigned is supplied from said plurality of peripheral base stations, assigns said cell identifier that is intended to be assigned to said cell that said base station manages; and when a determination request whether or not to assign said cell identifier that is intended to be assigned is supplied from said plurality of peripheral base stations, determines according to a state of assignment of cell identifiers to cells that are adjacent to said cell that said base station manages whether said cell identifier that is intended to be assigned can be assigned, and supplies a determination result to at least one of said plurality of peripheral base stations that originated said determination request;

wherein said control unit
supplies to said plurality of peripheral base stations cell information that indicates said cell identifier that is assigned to said cell that said base station manages; and when a determination request whether or not to assign said cell identifier that is intended to be assigned is supplied, permits assignment when said cell identifier that is intended to be assigned does not match cell identifiers that are indicated in cell information that was supplied from said plurality of peripheral base stations or does not match another cell identifier for which determination whether or not to assign a PCI was requested from the at least one of said peripheral base stations other than said base station that originated the request.

4. The base station as set forth in claim 3, wherein said control unit determines said cell identifier that is intended to be assigned to said cell that said base station manages based on cell identifier information that is supplied from said plurality of peripheral base stations.

5. A control method of a base station that manages a cell and that is capable of communication with a plurality of peripheral base stations that are base stations that manage cells that are adjacent to said cell, wherein:

when a cell identifier that identifies the cell is to be assigned to said cell that is managed, a determination request whether or not to assign said cell identifier that is intended to be assigned is supplied to said plurality of peripheral base stations, and when, in response to said determination request, permission to assign said cell identifier that is intended to be assigned is supplied from said plurality of peripheral base stations, said cell identifier that is intended to be assigned is assigned to said cell that is managed; and when a determination request whether or not to assign said cell identifier that is intended to be assigned is supplied from said plurality of peripheral base stations, said peripheral base station, determining whether or not to assign said cell identifier that is intended to be assigned is made according to a state of assignment of cell identifiers to cells that are adjacent to said cell that is managed, and a result of determination is supplied to at least one of said plurality peripheral base stations that originated said determination request;

wherein:
cell information that indicates said cell identifier that is assigned to said cell that is managed is supplied to said plurality of peripheral base stations; and when a determination request whether or not to assign said cell identifier that is intended to be assigned is supplied, the assignment is permitted when said cell identifier that is intended to be assigned does not match cell identifiers that are indicated in cell information that is supplied from said plurality of peripheral base stations or does not match another cell identifier for which determination whether or not to assign a PCI was requested from the at least one of said peripheral base stations other than said base station that originated the request.

6. The control method as set forth in claim 5, wherein a cell identifier that is intended to be assigned to said cell that is managed is determined based on cell identifier information that is supplied from said plurality of peripheral base stations.

* * * * *